(12) United States Patent
Himeno et al.

(10) Patent No.: US 10,352,631 B2
(45) Date of Patent: Jul. 16, 2019

(54) LAYERED HEAT EXCHANGER AND HEAT MEDIUM HEATING APPARATUS

(75) Inventors: Takamitsu Himeno, Tokyo (JP); Satoshi Kominami, Tokyo (JP); Yasunobu Zyoubouji, Tokyo (JP); Isao Hashimoto, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 13/818,886

(22) PCT Filed: Nov. 16, 2011

(86) PCT No.: PCT/JP2011/076431
§ 371 (c)(1),
(2), (4) Date: Apr. 12, 2013

(87) PCT Pub. No.: WO2012/067157
PCT Pub. Date: May 24, 2012

(65) Prior Publication Data
US 2013/0220987 A1   Aug. 29, 2013

(30) Foreign Application Priority Data
Nov. 17, 2010   (JP) .................................. 2010-256872

(51) Int. Cl.
*F28F 3/14*    (2006.01)
*B60H 1/22*    (2006.01)
(Continued)

(52) U.S. Cl.
CPC ............. *F28F 3/14* (2013.01); *B60H 1/2221* (2013.01); *F24H 1/121* (2013.01); *F24H 3/085* (2013.01);
(Continued)

(58) Field of Classification Search
CPC ......... B60H 1/2221; F24H 3/085; F24H 9/14; F28D 9/0075; F28D 9/0043; F28F 3/14;
(Continued)

(56) References Cited

U.S. PATENT DOCUMENTS 7,195,060 B2 *   3/2007   Martin et al. ................. 165/157
7,275,586 B2 *  10/2007   Beck et al. ...................... 165/42
(Continued)

FOREIGN PATENT DOCUMENTS

JP    01-178472 U   12/1989
JP    10-203141 A    8/1998
(Continued)

OTHER PUBLICATIONS

JP H10-203101 (A) Machine Translation (Translated Apr. 28, 2015).*
(Continued)

*Primary Examiner* — Tu B Hoang
*Assistant Examiner* — Joseph M Baillargeon
(74) *Attorney, Agent, or Firm* — Westermann, Hattori, Daniels & Adrian, LLP

(57) ABSTRACT

Provided are a layered heat exchanger that can prevent deterioration of sealing property due to deformation of sealing portions of inlet and outlet header sections when a PTC heater is sandwiched between flat heat exchanger tubes, and is pressed to be brought into close contact with the flat heat exchanger tubes, and a heat medium heating apparatus and a vehicle air-conditioning apparatus using the layered heat exchanger.

6 Claims, 8 Drawing Sheets

(51) Int. Cl.
*H05B 3/24* (2006.01)
*F24H 9/14* (2006.01)
*F24H 3/08* (2006.01)
*F24H 1/12* (2006.01)
*F28D 9/00* (2006.01)

(52) U.S. Cl.
CPC ............... *F24H 9/14* (2013.01); *F24H 9/146* (2013.01); *H05B 3/24* (2013.01); *F24H 2250/04* (2013.01); *F28D 9/0075* (2013.01); *H05B 2203/02* (2013.01); *H05B 2203/023* (2013.01)

(58) Field of Classification Search
CPC . H05B 3/24; H05B 2203/02; H05B 2203/023
USPC ............ 219/504; 392/397, 496; 165/41–44, 165/51–52, 64, 79, 166, 167, 58, 80.2
See application file for complete search history.

(56) References Cited

U.S. PATENT DOCUMENTS

| | | | | |
|---|---|---|---|---|
| 7,971,799 | B2* | 7/2011 | Colette | B60H 1/2225 165/41 |
| 7,977,606 | B2* | 7/2011 | Adachi et al. | 219/202 |
| 2005/0098308 | A1* | 5/2005 | Sohn | F16H 57/0415 165/153 |
| 2005/0133210 | A1* | 6/2005 | Inagaki et al. | 165/152 |
| 2005/0150646 | A1* | 7/2005 | Calhoun | F28F 9/0234 165/167 |
| 2007/0029077 | A1* | 2/2007 | Mirolli | 165/167 |
| 2008/0000889 | A1* | 1/2008 | Niederer | B60H 1/2221 219/205 |
| 2008/0087411 | A1* | 4/2008 | Richter | F28D 9/0043 165/166 |
| 2009/0126911 | A1* | 5/2009 | Shore et al. | 165/109.1 |
| 2010/0084121 | A1* | 4/2010 | Kivisakk et al. | 165/166 |
| 2010/0300651 | A1* | 12/2010 | Kumar et al. | 165/76 |
| 2011/0220334 | A1* | 9/2011 | Olsson et al. | 165/167 |
| 2011/0284194 | A1* | 11/2011 | Sarkar et al. | 165/167 |
| 2012/0055657 | A1* | 3/2012 | Moser et al. | 165/132 |
| 2012/0074118 | A1* | 3/2012 | Kim et al. | 219/202 |
| 2012/0085743 | A1* | 4/2012 | Clauss et al. | 219/202 |
| 2012/0247145 | A1* | 10/2012 | Denoual et al. | 62/498 |
| 2012/0267355 | A1* | 10/2012 | Trapp et al. | 219/202 |
| 2012/0312029 | A1* | 12/2012 | Brehm | F24H 3/0429 62/3.3 |
| 2012/0325445 | A1* | 12/2012 | Dinulescu | 165/166 |
| 2013/0026151 | A1* | 1/2013 | Adachi et al. | 219/202 |
| 2013/0186966 | A1* | 7/2013 | Taguchi | B60H 1/2221 237/57 |

FOREIGN PATENT DOCUMENTS

| | | | |
|---|---|---|---|
| JP | 10203141 A | * | 8/1998 |
| JP | 2000-130966 A | | 5/2000 |
| JP | 2000130966 A | * | 5/2000 |
| JP | 2001-012888 A | | 1/2001 |
| JP | 2005-030701 A | | 2/2005 |
| JP | 2006-342997 A | | 12/2006 |
| JP | 2006342997 A | * | 12/2006 |
| JP | 2008-007106 A | | 1/2008 |
| JP | 2008-056044 A | | 3/2008 |
| JP | 4100328 B2 | | 3/2008 |
| JP | 2008-527304 A | | 7/2008 |
| JP | 4178682 B2 | | 9/2008 |

OTHER PUBLICATIONS

JP 2000-130966(A) Machine Translation (Translated Apr. 28, 2015).*
JP 2006-342997(A) Machine Translation (Translated Apr. 28, 2015).*
International Search Report of PCT/JP2011/076431, dated Feb. 14, 2012.
Notice of Allowance dated Feb. 4, 2015, issued in corresponding Chinese application No. 201180041029.9. Explanation of Relevance— The Notice of Allowance has been received.

* cited by examiner

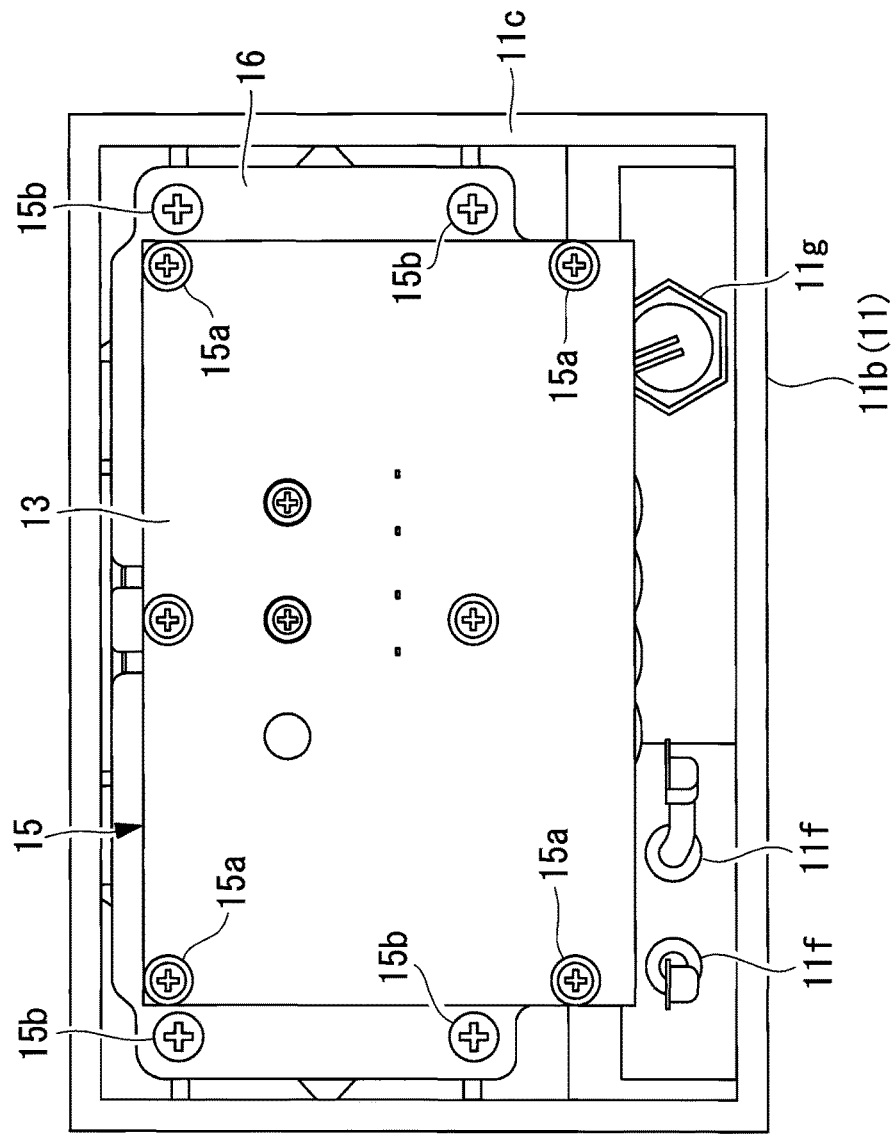

LAYERED HEAT EXCHANGER AND HEAT MEDIUM HEATING APPARATUS

TECHNICAL FIELD

The present invention relates to a layered heat exchanger for heating a heat medium, and a heat medium heating apparatus and a vehicle air-conditioning apparatus using the layered heat exchanger.

BACKGROUND ART

In a vehicle air-conditioning apparatus applied to an electric vehicle, a hybrid vehicle, etc., as one of heat medium heating apparatuses that heat a heated medium used as a heat source for heating, there has been known a heat medium heating apparatus using a PTC heater in which a positive temperature coefficient (hereinafter referred to as a PTC device) is used as a heat generating element. As for such heat medium heating apparatus, PTL 1 discloses a heat medium heating apparatus configured such that an inside of a housing including an inlet and an outlet for a heat medium is partitioned into a number of heat chambers and heat medium circulation chambers by partition walls, and that the heat medium flowing through the circulation chamber is heated by means of a PTC device inserted and installed on a heat chamber side so as to be brought into contact with the partition walls.

PTL 2 discloses a heat medium heating apparatus configured such that an electrode plate, an insulation layer, and a heat transfer layer are provided on both surfaces of a PTC device sandwiching the PTC device to thereby configure a plate-like PTC heater, a pair of heat medium flow boxes are layered that includes an inlet and an outlet for a heat medium on both surfaces of the PTC heater and that are communicated with each other, and such that a substrate housing box is disposed on an external surface of the pair of heat medium flow boxes. PTLs 3 and 4 disclose a layered heat exchanger configured such that a burring is formed around a communication hole of a header section (tank section) provided on both ends of a tube element, alignment at the time of stacking is made easier by fitting the burring, and such that poor bonding due to position deviation at the time of bonding is prevented.

PTL 5 discloses a layered cooler in which a plurality sets of flat cooling pipes through which a cooling medium is flowed are layered so as to sandwich both surfaces of an electronic component, wherein an expandable communication member is connected to an opening of the cooling pipe to thereby communicate between the openings of the adjacent cooling pipes, and a rib is provided at a specific peripheral section of the opening to set a compressive strength of the cooling pipe in a thickness direction to be sufficiently large with respect to a load applied at the time of manufacturing of a layered cooler.

CITATION LIST

Patent Literature

{PTL 1}
Japanese Unexamined Patent Application, Publication No. 2008-7106
{PTL 2}
Japanese Unexamined Patent Application, Publication No. 2008-56044
{PTL 3}
Japanese Unexamined Patent Application, Publication No. 2005-30701
{PTL 4}
the Publication of Japanese Patent No. 4178682
{PTL 5}
the Publication of Japanese Patent No. 4100328

SUMMARY OF INVENTION

Technical Problem

However, since the heat medium heating apparatus shown in PTL 1 has a configuration in which the PTC device is inserted and installed in the heat chamber formed by the partition wall, it is not easy to closely insert the PTC device between the partition walls used as heat transfer surfaces, so that there have been problems, such as a larger thermal contact resistance between the partition wall and the PTC device, and deterioration of a heat transfer efficiency. Since the heat medium heating apparatus shown in PTL 2 has a layered configuration in which the pair of heat medium flow boxes having a radiation fin on both surfaces of the PTC heater are layered, and the substrate housing box and a cover are provided outside the pair of heat medium flow boxes to thereby seal a heat medium channel, and are integrally fastened with a bolt, the thermal contact resistance between the PTC heater and the heat medium flow box can be made small, but the heat medium flow box and the substrate housing box are made by aluminum die casting in consideration of heat resistance property and heat transfer property, so that there have been problems, such as a limit of reduction in size and weight, and high cost.

In order to solve the above-described problems, it has been considered that a layered heat exchanger is applied to a heat medium heating apparatus. However, in a case of the layered heat exchanger, as shown in PTLs 3 and 4, it is general that a tube element and a fin that have been molded with a material cladded with brazing filler metal are layered and brazed in a furnace. Accordingly, a heat exchanger temporarily assembled using a jig may just be put in the furnace to be brazed, alignment at the time of stacking is made easier, position deviation at the time of bonding is prevented, and thereby good sealing property can be obtained, but such a method cannot be adopted in the above-described heat medium heating apparatus in which the PCT heater needs to be sandwiched to be brought into close contact with the tube element.

Consequently, as shown in PTL 5, there has been proposed the layered cooler in which the expandable communication member is configured to connect between the openings of the cooling pipe in order to reliably make close contact with each other the both surfaces of the electronic component and the cooling pipe, the rib is provided around the opening of the cooling pipe so that the communication member can be brazed in a pressurization state, the compressive strength of the cooling pipe in the thickness direction is increased, and thereby deformation at the time of pressurization is prevented. However, since the expandable communication member is needed and also the communication member is brazed in the pressurization state, there have been such problems that increase in the number of components and complexity of the configuration, such as providing the rib around the opening of the cooling pipe to prevent deformation, are unavoidable, which becomes a factor for cost increase, etc.

The present invention has been made in view of such circumstances, and an object of the present invention is to provide: a layered heat exchanger that can prevent deterioration of sealing property due to deformation of sealing portions of an inlet header section and an outlet header section, in a plurality sets of flat heat exchanger tubes being layered, a PTC heater being sandwiched and pressed between the flat heat exchanger tubes, and they being brought into close contact with one another; and a heat medium heating apparatus and a vehicle air-conditioning apparatus using the layered heat exchanger.

Solution to Problem

In order to solve the above-described problems, the layered heat exchanger, and the heat medium heating apparatus and the vehicle air-conditioning apparatus using the layered heat exchanger of the present invention employ the following measures.

Namely, a layered heat exchanger pertaining to one aspect of the present invention is the layered heat exchanger including: a flat heat exchanger tube configured by bonding two molded plates in which an inlet header section and an outlet header section are provided on both ends of a flat tube section through which a heat medium is flowed; and a heat exchanger pressing member that presses and makes closely attach the plurality sets of flat heat exchanger tubes layered so that the inlet header section and the outlet header section are communicated with each other through communication holes, wherein at least one of an input position of a pressing force by the heat exchanger pressing member, a position where the pressing force is transmitted to a bonding portion of the two molded plates, and a position where the pressing force is transmitted to a sealing portion between the inlet header sections and/or between the outlet header sections is set as a position deviated from a same line in a pressing force direction with respect to the inlet header section and the outlet header section.

According to the above-described aspect, in the layered heat exchanger in which the plurality sets of flat heat exchanger tubes are pressed by the heat exchanger pressing member to be closely attached to one another, since one of the input positions of the pressing force by the heat exchanger pressing member, the position where the pressing force is transmitted to the bonding portion of the two molded plates, and the position where the pressing force is transmitted to the sealing portion between the inlet header sections and/or between the outlet header sections is set as the position deviated from the same line in the pressing force direction with respect to the inlet header section and the outlet header section, the pressing force by the heat exchanger pressing member is dispersed in the bonding portion of the two molded plates or in the sealing portions between the inlet header sections and between the outlet header sections, the pressing force is not strongly applied to a specific part of each sealing portion between the inlet header sections and between the outlet header sections, peripheral deformation due to strong application of the pressing force to the specific part is suppressed, and thereby generation of a gap in a sealing surface can be blocked. Accordingly, sealing property in an internal pressure being applied into the flat heat exchanger tubes is improved, and leakage of the heat medium can be prevented.

In the above-described layered heat exchanger, burrings mate-fitted in each other may be provided around the communication holes of the inlet header section and the outlet header section.

In a manner as described above, since the burrings mate-fitted in each other are provided around the communication holes of the inlet header section and the outlet header section, a strength around the communication holes of the inlet header section and the outlet header section is improved by means of the burrings, deformation at the time of press by the heat exchanger pressing member can be more reduced, and the burrings can be utilized for positioning at the time of stacking of the flat heat exchanger tube, so that poor sealing due to position deviation can also be prevented. Accordingly, sealing property between the inlet header sections and between the outlet header sections of the plurality sets of flat heat exchanger tubes is improved, and leakage of the heat medium can be reliably prevented.

In the above-described layered heat exchanger, the burrings may be made as a tapered shape.

In a manner as described above, since the burrings are made as the tapered shape, micro deformation generated when the plurality sets of flat heat exchanger tubes are layered, and the inlet header sections and the outlet header sections are pressed by the heat exchanger pressing member to be brought into close contact with each other is absorbed by means of a tapered portion, the inlet header sections and the outlet header sections can be reliably brought into close contact with each other, and a dimensional tolerance of the flat heat exchanger tube including the inlet and outlet header sections can also be absorbed by means of the tapered portion. Accordingly, sealing property between the inlet header sections and between the outlet header sections of the plurality sets of flat heat exchanger tubes can further be improved, and leakage of the heat medium can be reliably prevented.

In any of the layered heat exchangers mentioned above, sealing may be made between the inlet header sections and between the outlet header sections respectively via a sealing material interposed on the sealing surface.

In a manner as described above, sealing is made between the inlet header sections and between the outlet header sections respectively via the sealing material interposed on the sealing surfaces. When the plurality sets of flat heat exchanger tubes are layered, the sealing material (a liquid gasket, an O-ring, or the like) is interposed on the sealing surfaces between the inlet header sections and between the outlet header sections and is brought into contact with the inlet header sections and the outlet header sections by pressing with the heat exchanger pressing member, and thereby sealing between the inlet header sections and the outlet header sections can be achieved. Accordingly, sealing property between the inlet header sections and between the outlet header sections is sufficiently secured, reliability for prevention of leakage of the heat medium can be improved, and simplification of a sealing structure and easy assembling can be achieved.

In any of the layered heat exchangers mentioned above, the heat exchanger pressing member is made as a quadrilateral shape corresponding to a longitudinal direction of the flat heat exchanger tube, and when two tightening and fixing sections of each of both ends of the heat exchanger pressing member are set as the input positions of the pressing force, centers of the communication holes provided in the inlet header section and the outlet header section of the flat heat exchanger tube may be located on a line connecting the two input positions of each of the both ends.

In a manner as described above, the heat exchanger pressing member has the quadrilateral shape corresponding to the longitudinal direction of the flat heat exchanger tube, and when the two tightening and fixing sections of each of the both ends of the heat exchanger pressing member are set as the input positions of the pressing force, the centers of the communication holes provided in the inlet header section and the outlet header section of the flat heat exchanger tube are located on the line connecting the two input positions of each of the both ends, so that when the heat exchanger pressing member is tightened and fixed, and the pressing force is applied to the flat heat exchanger tube, the force is dispersed in circumferential directions of the communication holes of the inlet header section and the outlet header section, and a portion in the sealing portion around the communication holes to which the force is locally and strongly applied can be eliminated. Accordingly, deformation in the sealing portion around the communication holes is suppressed, generation of the gap in the sealing surface is blocked, and sealing property between the inlet header sections and between the outlet header sections can be improved.

A plurality sets of PTC heaters are incorporated between the flat tube sections of the plurality sets of flat heat exchanger tubes in the above-mentioned layered heat exchanger, and thereby the heat medium flowed through the flat heat exchanger tubes are heatable by the PTC heaters.

In a manner as described above, since the plurality sets of PTC heaters are incorporated between the flat tube sections of the plurality sets of flat heat exchanger tubes in the above-mentioned layered heat exchanger, and thereby the heat medium flowed through the flat heat exchanger tubes can be heated by the PTC heaters, the plurality sets of PTC heaters incorporated between the plurality sets of flat heat exchanger tubes, and the flat tube section of each flat heat exchanger tube are reliably brought into close contact with one another by the pressing force of the heat exchanger pressing member, and a thermal contact resistance between the PTC heaters and the flat heat exchanger tube can be reduced. Accordingly, a heat transfer efficiency between the PTC heaters and the flat heat exchanger tube is increased to thereby improve heating performance, high performance of the heat medium heating apparatus can be achieved, and leakage of the heat medium, etc. can be reliably eliminated.

The vehicle air-conditioning apparatus pertaining to the present invention is the vehicle air-conditioning apparatus configured such that a heat medium heated by a heat medium heating apparatus is circulatable in a radiator disposed in an air channel, wherein the heat medium heating apparatus is the above-described heat medium heating apparatus.

According to the present invention, since it is configured that the heat medium heated by the above-mentioned heat medium heating apparatus can be circulated in the radiator disposed in the air channel, leakage of the heat medium in a heat medium circulation circuit in the radiator, etc. can be reliably eliminated, and heating performance of the heat medium by means of the heat medium heating apparatus can be enhanced. Accordingly, improvement in reliability and air-conditioning performance of the vehicle air-conditioning apparatus can be achieved.

Advantageous Effects of Invention

According to the layered heat exchanger of the present invention, since the pressing force by the heat exchanger pressing member is dispersed in the bonding portion of the two molded plates or in the sealing portions between the inlet header sections and between the outlet header sections, the pressing force is not strongly applied to a specific part of each of the sealing portions between the inlet header sections and between the outlet header sections, peripheral deformation due to strong application of the pressing force to the specific part is suppressed, and thereby generation of the gap in the sealing surface can be blocked, sealing property in the internal pressure being applied into the flat heat exchanger tube is improved, and leakage of the heat medium can be prevented.

According to the heat medium heating apparatus of the present invention, since the plurality sets of PTC heaters incorporated between the plurality sets of flat heat exchanger tubes, and the flat tube section of each flat heat exchanger tube are reliably brought into close contact with one another by the pressing force of the heat exchanger pressing member, and the thermal contact resistance between the PTC heaters and the flat heat exchanger tube can be reduced, the heat transfer efficiency between the PTC heaters and the flat heat exchanger tube is increased to thereby improve heating performance, high performance of the heat medium heating apparatus can be achieved, and leakage of the heat medium, etc. can be reliably eliminated.

According to the vehicle air-conditioning apparatus of the present invention, since leakage of the heat medium in the heat medium circulation circuit in the radiator, etc. can be reliably eliminated, and heating performance of the heat medium by means of the heat medium heating apparatus can be enhanced, improvement in reliability and air-conditioning performance of the vehicle air-conditioning apparatus can be achieved.

BRIEF DESCRIPTION OF DRAWINGS

FIG. 3A is a plan view of the heat medium heating apparatus shown in FIG. 2.

DESCRIPTION OF EMBODIMENTS

Hereinafter, embodiments pertaining to the present invention will be described with reference to drawings.

First Embodiment

Hereinafter, a first embodiment of the present invention will be described using FIGS. 1 to 6B.

Figure 1:
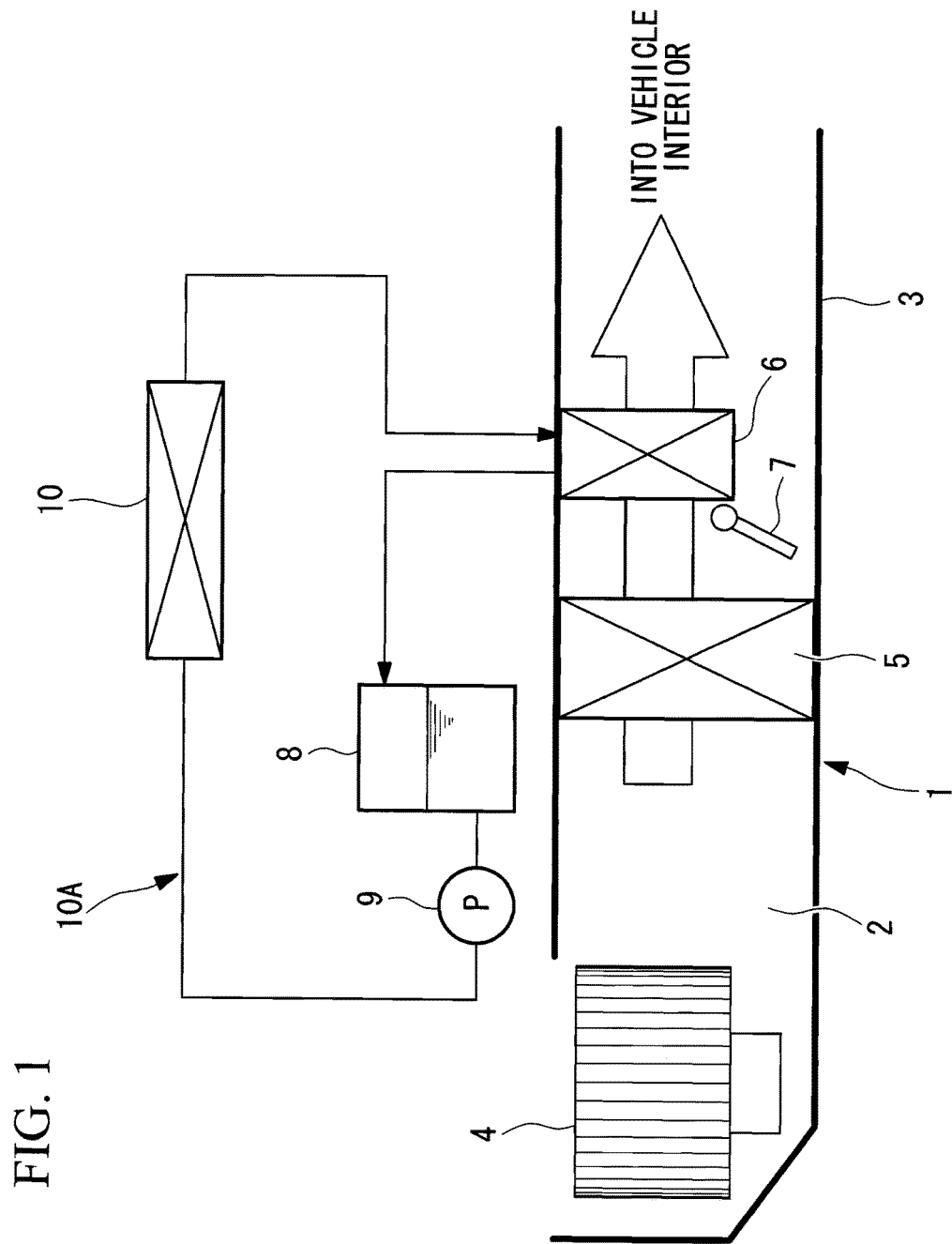
FIG. 1 is a schematic configuration diagram of a vehicle air-conditioning apparatus including a layered heat exchanger and a heat medium heating apparatus pertaining to a first embodiment of the present invention.

FIG. 1 shows a schematic configuration diagram of a vehicle air-conditioning apparatus including a layered heat exchanger and a heat medium heating apparatus pertaining to the first embodiment of the present invention.

A vehicle air-conditioning apparatus 1 includes a casing 3 that forms an air channel 2 for directing a temperature-adjusted air into a vehicle interior, after taking in an outside air or an air in the vehicle interior and adjusting a temperature thereof.

Inside the casing 3, installed are: a blower 4 that suctions the outside air or the air in the vehicle interior to raise a pressure sequentially from an upstream side to a downstream side of the air channel 2, and pressure-feeds the pressure-raised air to the downstream; a cooler 5 that cools the air pressure-fed by the blower 4; a radiator 6 that heats the air having passed through the cooler 5 to thereby be cooled; and an air mix damper 7 that adjust a flow ratio of an amount of air passing through the radiator 6 and an amount of air bypassing the radiator 6, air-mixes the airs on the downstream side thereof, and thereby adjusts a temperature of an air to be temperature-adjusted.

A downstream side of the casing 3 is connected to a plurality of blow-off openings through which a temperature-adjusted air is blown off into a vehicle interior through a blow-off mode switching damper and a duct that are not shown.

The cooler 5 constitutes a refrigerant circuit together with a compressor, a condenser, an expansion valve, etc. that are not shown, and cools an air that passes through the refrigerant circuit by evaporating an adiabatically-expanded refrigerant by means of an expansion valve. The radiator 6 constitutes a heat medium circulation circuit 10A together with a tank 8, a pump 9, and a heat medium heating apparatus 10, and warms an air that passes through the heat medium circulation circuit 10A by heat media (for example, an antifreeze solution etc.) heated to a high temperature by the heat medium heating apparatus 10 being circulated through the pump 9.

Figure 2:
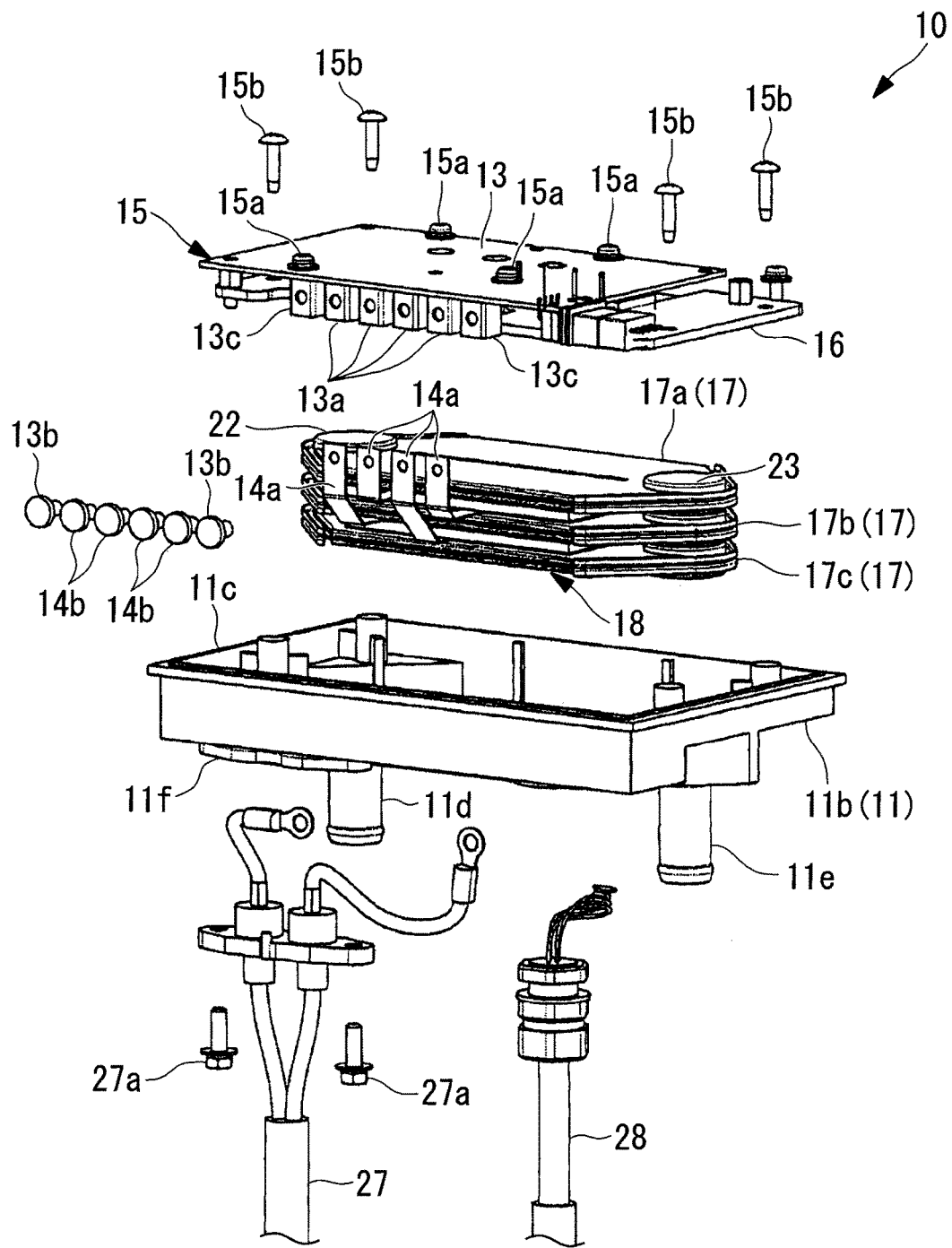
FIG. 2 is an exploded perspective view for describing an assembling procedure of the heat medium heating apparatus shown in FIG. 1.
Figure 3B:
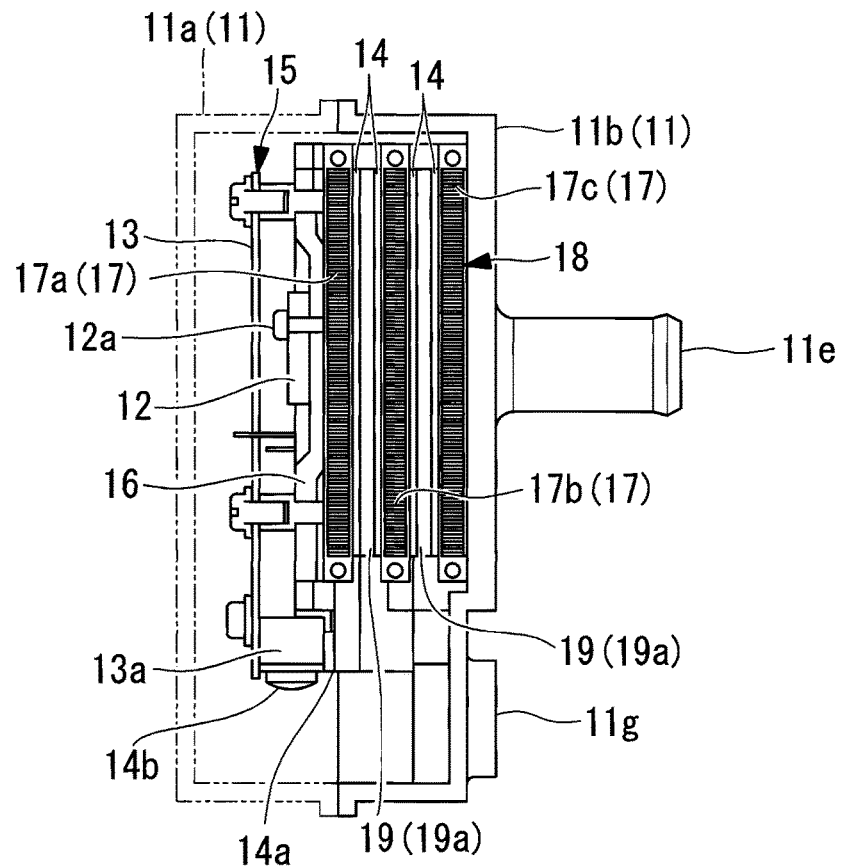
FIG. 3B is a side view of the heat medium heating apparatus shown in FIG. 2.

FIG. 2 shows an exploded perspective view for describing a procedure to assemble the heat medium heating apparatus 10 shown in FIG. 1, and FIG. 3A shows a plan view of the heat medium heating apparatus 10. FIG. 3B shows a side view of the heat medium heating apparatus 10. The heat medium heating apparatus 10, as shown in FIG. 2, includes: a control board 13; an electrode plate 14 (refer to FIG. 3B); a plurality of semiconductor switching devices 12 (refer to FIG. 3B) constituted by an IGBT etc.; a heat exchanger pressing member (a pressing member) 16; a layered heat exchanger 18 in which a plurality sets (for example, three sets) of flat heat exchanger tubes 17 are layered; a plurality sets of PTC (Positive Temperature Coefficient) devices 19a (refer to FIG. 3B); and a casing 11 that houses the control board 13, electrode plate 14, semiconductor switching devices 12, layered heat exchanger 18, PTC devices 19a, heat exchanger pressing member 16, etc. A plurality sets of PTC heaters 19 are constituted by the electrode plate 14, the PTC device 19a, an insulator that will be described hereinafter, etc.

The casing 11 has a configuration divided into two of an upper half portion and a lower half portion, and includes an upper case 11a (refer to FIG. 3B) located at the upper half portion and a lower case 11b located at the lower half portion. Insides of the upper case 11a and the lower case 11b, a space is formed to house the above-described control board 13, semiconductor switching device 12, heat exchanger pressing member 16, layered heat exchanger 18, electrode plate 14, plurality sets of PTC heaters 19, etc by placing the upper case 11a from an upper side of the lower case 11b to an opening 11c of the lower case 11b.

On a bottom surface of the lower case 11b, integrally provided are a heat medium inlet passage (heat medium introduction passage) 11d for directing the heat medium introduced into the layered heat exchanger 18, and a heat medium outlet passage (heat medium introduction passage) 11e for introducing the heat medium having flowed in the layered heat exchanger 18 out of the layered heat exchanger 18. The lower case 11b is molded with a resin material (for example, PBT) close to an aluminum alloy material in linear expansion, the aluminum alloy material forming the flat heat exchanger tube 17 housed in an internal space of the lower case 11b. The upper case 11a is desirably a molded product made of the same resin material as the lower case 11b. As described above, reduction in weight can be achieved by constituting the casing 11 with the resin material.

On the bottom surface of the lower case 11b, opened are a power harness hole 11f and an LV harness hole 11g (refer to FIG. 3A) for penetrating tips of a power harness 27 and an LV harness 28. The power harness 27 supplies electric power to the PTC heater 19 through the control board 13 and the semiconductor switching device 12, a tip of the power harness 27 branches into two-pronged shape, and the power harness 27 can be screwed by a power harness connecting screw 13b to two power harness terminal blocks 13c provided on the control board 13. The LV harness 28 transmits a signal for control to the control board 13, and a tip of the LV harness 28 is adapted to be connected to the control board 13 via a connector.

The semiconductor switching device 12 and the control board 13 constitute a control system that performs energization control to the plurality sets of PTC heaters 19 based on a command from an ECU (a higher-level control apparatus), and are configured so that an energized state to the plurality sets of PTC heaters 19 can be switched through the plurality of semiconductor switching devices 12, such as the IGBT. The plurality sets of flat heat exchanger tubes 17 constituting the layered heat exchanger 18 are then layered so as to sandwich the plurality sets of PTC heaters 19 from both surface sides.

Figure 4A:
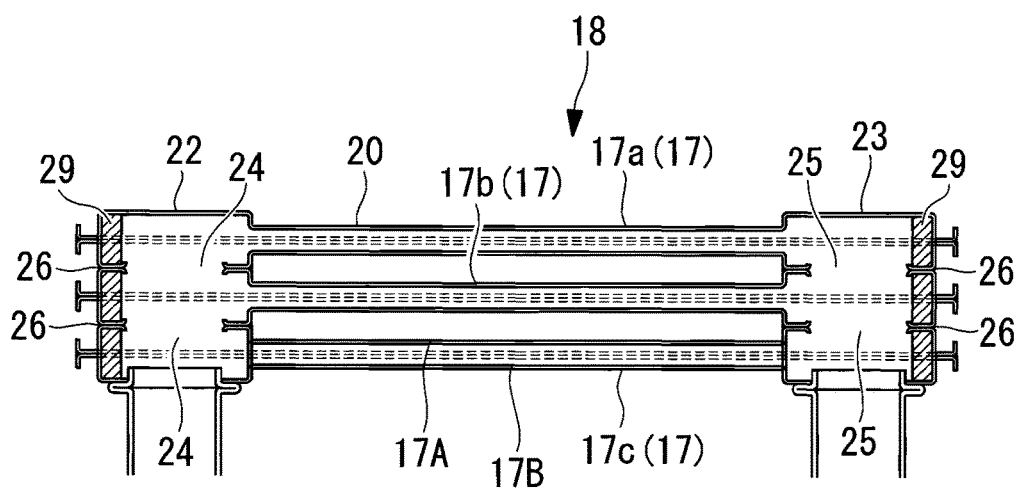
FIG. 4A is a longitudinal sectional view of a layered heat exchanger incorporated in the heat medium heating apparatus shown in FIGS. 2, 3A, and 3B.

The flat heat exchanger tube 17 constituting the layered heat exchanger 18 is, as shown in FIG. 4A, configured by two molded plates 17A and 17B made of aluminum alloy being bonded with brazing, and includes: a flat tube section 20; an inlet header section 22 through which a heat medium formed on both ends of the flat tube section 20 is supplied; and an outlet header section 23 out of which the heat medium is introduced. The layered heat exchanger 18 herein is configured such that for example, three sets of flat heat exchanger tubes 17 are layered so as to be in parallel with one another. In the three sets of flat heat exchanger tubes 17, lower, middle, upper tiers of flat heat exchanger tubes 17c, 17b, and 17a are layered in that order.

Figure 4B:
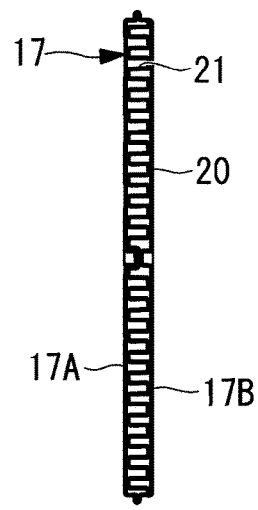
FIG. 4B is a cross-sectional view of a flat tube section of a layered heat exchanger incorporated in the heat medium heating apparatus shown in FIGS. 2, 3A, and 3B.

A corrugated inner fin 21 is formed in the flat tube section 20 of the flat heat exchanger tubes 17a, 17b, and 17c as shown in FIG. 4B, and thereby a plurality of heat medium flow passages communicated in an axial direction thereof are formed in each of the flat heat exchanger tubes 17*a* and 17*b* and 17*c*. The inner fin 21 is formed in each of the flat heat exchanger tubes 17*a* and 17*b* and 17*c*, and thereby rigidity is increased. Therefore, also in a case where three sets of flat heat exchanger tubes 17*a*, 17*b*, and 17*c* are pressed against an inner bottom surface of the lower case 11*b* by means of the heat exchanger pressing member 16 of a substrate subassembly 15 that will be described hereinafter, each of the flat heat exchanger tubes 17*a*, 17*b*, and 17*c* are made difficult to deform.

The flat heat exchanger tubes 17*a* and 17*b* and 17*c* respectively have a long flat shape in an axial direction (a horizontal direction in FIG. 4A) when viewed from a plane. These flat heat exchanger tubes 17*a*, 17*b*, and 17*c* are formed wider in a flat direction, i.e., in a direction perpendicular to the axial direction (a vertical direction in FIG. 4B). The inlet header section 22 and the outlet header section 23 are formed on both ends in the axial direction of each of the flat heat exchanger tubes 17*a*, 17*b*, and 17*c*, i.e., on both ends of the flat tube section 20, and communication holes 24 and 25 are provided in central portions of the inlet header section 22 and the outlet header section 23, respectively.

In the above-described lower, middle, upper tiers of three sets of flat heat exchanger tubes 17*c*, 17*b*, and 17*a*, peripheries of the communication holes 24 and 25 are sealed by means of a sealing material 26 having been applied on the sealing surface, such as a liquid gasket or an O-ring, which is interposed between the inlet header sections 22 and between the outlet header sections 23, in the flat heat exchanger tubes 17*c*, 17*b*, and 17*a* being layered. The plurality sets of PTC heaters 19 are then sandwiched between the flat tube sections 20 of the three sets of flat heat exchanger tubes 17*c*, 17*b*, and 17*a* from both sides through the electrode plates 14 provided on both surfaces of the PTC heaters 19, and thereby the flat heat exchanger tubes 17*c*, 17*b*, and 17*a* are layered in parallel. A spacer 29 may be inserted into the inlet header section 22 and the outlet header section 23 of the flat heat exchanger tubes 17*c*, 17*b*, and 17*a*.

Figure 5:
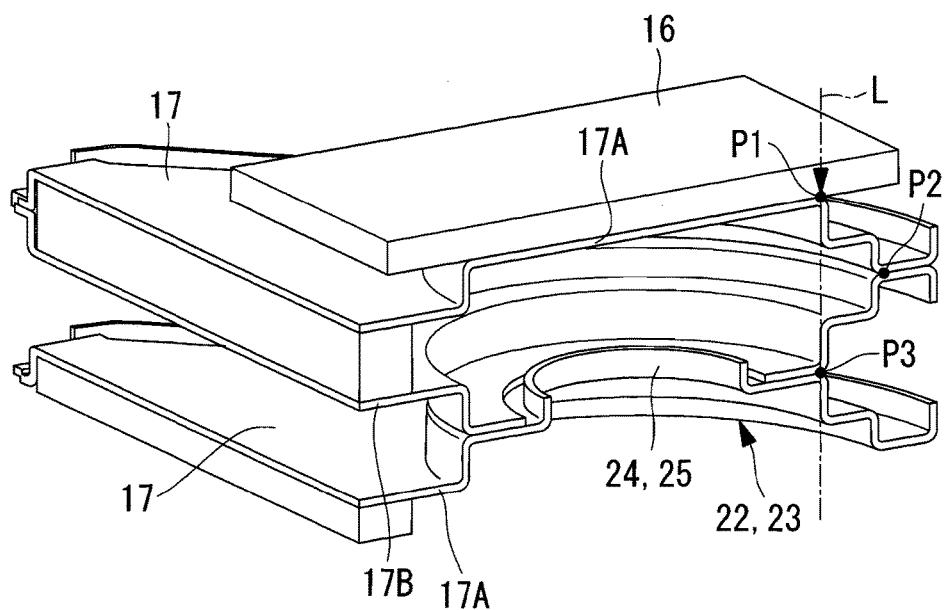
FIG. 5 is an enlarged perspective view representing a stacking state of inlet/outlet header sections of the layered heat exchanger shown in FIGS. 4A and 4B.

The inlet header section 22 and the outlet header section 23 of each of the flat heat exchanger tubes 17*a*, 17*b*, and 17*c* are layered as described above, and in order to prevent deterioration of sealing property caused by a pressing force strongly applied to a specific part, thereby a periphery of the part being deformed, and a gap being generated, in the inlet header section 22 and the outlet header section 23 being pressed against the inner bottom surface of the lower case 11*b* by the heat exchanger pressing member 16 of the substrate subassembly 15 that will be described hereinafter, and being tightened and fixed, the layered heat exchanger is, as shown in FIG. 5, configured such that the pressing force by the heat exchanger pressing member 16 is not focused on a specific part on a same line L in a pressing force direction with respect to the inlet header section 22 and the outlet header section 23, and it is not strongly applied to the part.

That is, when an input position of the pressing force by the heat exchanger pressing member 16 is set as P1, a position is set as P2 where the pressing force is transmitted to the bonding portion of the two molded plates 17A and 17B, and a position is set as P3 where the pressing force is transmitted to the sealing portion between the inlet header sections 22 and/or between the outlet header sections 23, with respect to the inlet header section 22 and the outlet header section 23, at least one of the P1, P2, and P3 is set to be located at a position deviated from the same line L in the pressing force direction so that the three points P1, P2, and P3 are not located on the same line L in the pressing force direction.

As described above, in order to displace at least one of the P1, P2, and P3 positions from the same line L in the pressing force direction, a mold structure of a mold of the two molded plates 17A and 17B that constitute the flat heat exchanger tube 17 is made to have a shape where at least one position of the P1, P2, and P3 positions is displaced based on a previously analyzed result, and the flat heat exchanger tube 17 may just be constituted using the molded plates 17A and 17B molded by means of the mold.

Three sets of flat heat exchanger tubes 17*c*, 17*b*, and 17*a* configured as described above are layered in this order, and are pressed against the inner bottom surface of the lower case 11*b* through the substrate subassembly 15 that will be described hereinafter, whereby via the sealing material (a liquid gasket, an O-ring, or the like) 26, between bottom surfaces of the inlet header section 22 and the outlet header section 23 of the middle tier of flat heat exchanger tube 17*b*, and top surfaces of the inlet header section 22 and the outlet header section 23 of the lower tier of flat heat exchanger tube 17*c* located under the flat heat exchanger tube 17*b*, and between top surfaces of the inlet header section 22 and the outlet header section 23 of the middle tier of flat heat exchanger tube 17*b*, and bottom surfaces of the inlet header section 22 and the outlet header section 23 of the upper tier of flat heat exchanger tube 17*a* located above the flat heat exchanger tube 17*b* are respectively brought into close contact with each other.

The flat heat exchanger tubes 17*a*, 17*b*, and 17*c* that constitute the layered heat exchanger 18 are layered as described above, whereby the communication holes 24 and 25 of each of the upper tier of flat heat exchanger tube 17*a*, the middle tier of flat heat exchanger tube 17*b*, and the lower tier of flat heat exchanger tube 17 are communicated with each other, the inlet header section 22 and the outlet header section 23 are communicated with each other, and the periphery of each of the communication holes 24 and 25 is sealed in a sealed state by the sealing material 26.

As a result, the heat medium directed from the heat medium inlet passage 11*d* is directed from each inlet header section 22 of the layered heat exchanger 18 into the flat tube section 20 of each of the flat heat exchanger tubes 17*a*, 17*b*, and 17*c*. This heat medium is, in a process of being flowed in the flat tube section 20, heated by the PTC heater 19 and a temperature thereof is increased, and the heat medium flows to each outlet header section 23, and is introduced outside the heat medium heating apparatus 10 through the heat medium outlet passage 11*e*. The heat medium introduced out of the heat medium heating apparatus 10 is supplied to the radiator 6 through the heat medium circulation circuit 10A (refer to FIG. 1).

The electrode plate 14, as shown in FIG. 3B, supplies electric power to the PTC device 19*a*, and is a plate material made of aluminum alloy having a rectangular shape in a planar view. The electrode plates 14 are layered on both surfaces of the PTC device 19*a* sandwiching the PTC device 19*a* so that one of the electrode plates 14 is in contact with a top surface of the PTC device 19*a*, and the other one of them is in contact with a bottom surface of the PTC device 19*a*. The top surface of the PTC device 19*a* and the bottom surface thereof are sandwiched by these two electrode plates 14.

The electrode plate 14 located on a top surface side of the PTC device 19*a* is arranged so that a top surface of the electrode plate 14 is in contact with a bottom surface of the flat heat exchanger tube 17, and the electrode plate 14 located on a bottom surface side of the PTC device 19*a* is arranged so that a bottom surface of the electrode plate 14 is in contact with a top surface of the flat heat exchanger tube 17. In a case of the embodiment, two electrode plates 14 are arranged between the lower tier of flat heat exchanger tube 17c and the middle tier of flat heat exchanger tube 17b, and between the middle tier of flat heat exchanger tube 17b and the upper tier of flat heat exchanger tube 17a, respectively, i.e., a total of four electrode plates 14 are arranged.

Each of the four electrode plates 14 has a substantially same shape as the flat heat exchanger tubes 17a, 17b, and 17c. Each electrode plate 14 has one terminal 14a provided on a long side thereof. When each electrode plate 14 is layered, the terminal 14a provided at the electrode plate 14 is located along the long side of the electrode plate 14 without being overlapped. Namely, the terminal 14a provided at each electrode plate 14 is provided in a state where a position thereof is displaced little by little along the long side, and it is provided so as to be aligned in series when each electrode plate 14 is layered. Each terminal 14a is provided so as to project upwardly, and is connected to the terminal block 13a provided on the control board 13 through a terminal connecting screw 14b.

In the substrate subassembly 15, the control board 13 and the heat exchanger pressing member 16 are disposed in parallel, and the plurality of semiconductor switching devices 12, such as the IGBT, installed on a top surface of the heat exchanger pressing member 16, are sandwiched therebetween. The control board 13 and the heat exchanger pressing member 16 are fixed with, for example, four substrate subassembly connecting screws 15a, and thereby the substrate subassembly 15 is integrated.

On the control board 13 constituting the substrate subassembly 15, four terminal blocks 13a are aligned in series with a bottom surface of one side of the control board 13 corresponding to the four terminals 14a aligned in series with each electrode plate 14. Two power harness terminal blocks 13c connected to tips branched into two from the power harness 27 are provided so as to line on both end sides in series with the four terminal blocks 13a. These terminal blocks 13a and power harness terminal blocks 13c are provided projecting downwardly from a bottom surface of the control board 13. Each of the terminal blocks 13a and power harness terminal blocks 13c is disposed in series along a long side of the flat heat exchanger tube 17 of the layered heat exchanger 18.

Each of the terminal blocks 13a and power harness terminal blocks 13c that has been provided on the control board 13 is provided so that it is located a little more upwardly than the opening 11c of the lower case 11b. Therefore, it is easy to fix the terminal 14a of the electrode plate 14 and the tips of the power harness 27 that are connected to each of the terminal blocks 13a and power harness terminal blocks 13c.

As shown in FIG. 3B, the semiconductor switching device 12 constituted by the IGBT etc. is a transistor resin-molded in a substantially rectangular shape. The semiconductor switching device 12 is a heat generating device that generates heat by actuation, is the top surface of the heat exchanger pressing member 16, is screwed through a connecting screw 12a near the inlet header section 22 of the upper tier of flat heat exchanger tube 17a of the layered heat exchanger 18, and is cooled with the heat exchanger pressing member 16 being as a heat sink.

The heat exchanger pressing member 16 constituting the substrate subassembly 15 is a plate material made of aluminum alloy in a flat quadrilateral shape (rectangular shape) when viewed from a plane. The heat exchanger pressing member 16 is made larger than the control board 13 in the axial direction (horizontal direction in FIG. 3A), and a size of the heat exchanger pressing member 16 is made large enough to cover the top surfaces of the flat heat exchanger tubes 17a, 17b, and 17c of the layered heat exchanger 18. On four corners of the heat exchanger pressing member 16 made larger than the control board 13 in the axial direction, provided are four holes (not shown) through which a substrate subassembly fixing screw 15b (refer to FIG. 3A) for fixing the heat exchanger pressing member 16 to the lower case 11b can penetrate.

The substrate subassembly 15 is placed above the upper tier of flat heat exchanger tube 17a of the layered heat exchanger 18. Namely, the substrate subassembly 15 is arranged so that a bottom surface of the heat exchanger pressing member 16 is in contact with the top surface of the upper tier of flat heat exchanger tube 17a. The heat exchanger pressing member 16 is screwed to the lower case 11b through the four substrate subassembly fixing screws 15b, and thereby the substrate subassembly 15 sandwiches the layered three sets of flat heat exchanger tubes 17a, 17b, and 17c, and the two sets of PTC heaters 19 sandwiched therebetween between the bottom surface of the heat exchanger pressing member 16 and the inner bottom surface of the lower case 11b.

As described above, the substrate subassembly 15 is screwed to the lower case 11b, and thereby the three sets of flat heat exchanger tubes 17a, 17b, and 17c layered in an inner bottom surface direction of the lower case 11b, and the two sets of PTC heaters 19 sandwiched therebetween are pressed. Since the heat exchanger pressing member 16 constituting the substrate subassembly 15 is the plate material made of aluminum alloy, it is used as the heat sink that cools the semiconductor switching devices 12, such as the IGBT, installed on the heat exchanger pressing member 16 through cold energy of the heat medium flowing through the flat heat exchanger tubes 17a, 17b, and 17c of the layered heat exchanger 18.

Next, there will be described an assembling procedure of the layered heat exchanger 18 and the heat medium heating apparatus 10 pertaining to the embodiment using FIGS. 2, 3A, and 3B.

First, the lower tier of flat heat exchanger tube 17c of the three sets of flat heat exchanger tubes 17 constituting the layered heat exchanger 18 is installed in the internal space of the lower case 11b so as to be substantially in parallel with the inner bottom surface of the lower case 11b. Next, the PTC heater 19 is layered on the flat tube section 20 of the flat heat exchanger tube 17c from an upper side of the lower tier of flat heat exchanger tube 17c, with both surfaces of the PTC heater 19 being sandwiched by an insulation sheet (not shown).

Further, the sealing material 26, such as a liquid gasket and an O-ring, is placed on the top surfaces, or sealing surfaces of the inlet header section 22 and the outlet header section 23 of the lower tier of flat heat exchanger tube 17c, and the middle tier of flat heat exchanger tube 17b is layered on the sealing material 26 from an upper side thereof. The PTC heater 19 is layered on the flat tube section 20 of the middle tier of flat heat exchanger tube 17b from an upper side of the middle tier of flat heat exchanger tube 17b, with both surfaces of the PTC heater 19 being sandwiched by an insulation sheet similarly to the above. Next, the sealing material 26 similar to the above is applied to the sealing surfaces of the top surfaces of the inlet header section 22 and the outlet header section 23 of the middle tier of flat heat exchanger tube 17b, and the upper tier of flat heat exchanger tube 17a is layered from the upper side of the middle tier of flat heat exchanger tube 17b.

After the substrate subassembly 15 is layered from an upper side of the upper tier of flat heat exchanger tube 17a layered as described above so that the heat exchanger pressing member 16 is located under the substrate subassembly 15, the heat exchanger pressing member 16 of the substrate subassembly 15 layered on the upper tier of flat heat exchanger tube 17a is tightened and fixed to the lower case 11b by means of the substrate subassembly fixing screw 15b. As a result, the inlet header sections 22 and the outlet header sections 23 of the flat heat exchanger tubes 17a, 17b, and 17c are pressed in the inner bottom surface direction of the lower case 11b to be brought into close contact with one another, and the peripheries of the communication holes 24 and 25 between the inlet header sections 22 and between the outlet header sections 23 of each of the flat heat exchanger tubes 17a, 17b, and 17c are sealed by means of the sealing material 26.

When a liquid gasket is used as the sealing material 26, a part of the liquid gasket applied to the inlet header section 22 and the outlet header section 23 overflows onto a matching surface, gets contact with the air, and thereby reacts with moisture to be hardened by the three sets of flat heat exchanger tubes 17a, 17b, and 17c being pressed to be brought into close contact with one another. Since between the inlet header sections 22 and between the outlet header sections 23 of each of the flat heat exchanger tubes 17 are brought into close contact with one another due to the above-described press, the PTC heaters 19 and the electrode plates 14 that have been sandwiched between the lower tier of flat heat exchanger tube 17c and the middle tier of flat heat exchanger tube 17b, and between the middle tier of flat heat exchanger tube 17b and the upper tier of flat heat exchanger tube 17a are also brought into close contact with outer surfaces of the flat tube sections 20 of the flat heat exchanger tubes 17a, 17b, and 17c, respectively, and thermal contact resistance therebetween is reduced.

Subsequently, each terminal block 13a provided on the control board 13 constituting the substrate subassembly 15, and the terminal 14a of each electrode plate 14 are actually screwed by the terminal connecting screw 14b, and the power harness 27 is inserted in the power harness hole 11f, and the tips of the power harness 27 and each power harness terminal block 13c provided on the control board 13 are screwed by the power harness connecting screw 13b. Further, the tip of the LV harness 28 is inserted into the lower case 11b from the LV harness hole 11g opened on a side wall of the lower case 11b, and then connected to the control board 13 via a connector. Next, the power harness 27 is fixed by means of a power harness fixing screw 27a from an outer bottom surface of the lower case 11b, and the LV harness 28 is fixed to the LV harness hole 11g.

After that, a sealing material (the liquid gasket or the O-ring similar to the above-described one interposed on the top surfaces of the inlet header section 22 and the outlet header section 23 may be used) is interposed in the opening 11c of the lower case 11b, further the upper case 11a is placed on the opening 11c of the lower case 11b from an upper side, a clip (not shown) provided on the upper case 11a is hooked on a claw (not shown) provided on the lower case 11b, the upper case 11a and the lower case 11b are fastened, and thereby assembling of the heat medium heating apparatus 10 is completed (finished).

The liquid gasket (sealing material) 26 used in the embodiment is a liquid sealing material having excellent heat resistance property, and hardenability to harden by getting contact with moisture in the air that is suitable for sealing between the inlet header sections 22 and between the outlet header sections 23 of the flat heat exchanger tube 17 exposed to a high temperature, etc., and for example, a silicone series liquid gasket of a product number 1207d whose main ingredient is silicone made by Three Bond Co., Ltd. can be used.

In this way, according to the layered heat exchanger 18, and the heat medium heating apparatus 10 and the vehicle air-conditioning apparatus 1 using the layered heat exchanger 18 pertaining to the embodiment, the following operational effects are exerted. The plurality sets (three sets) of flat heat exchanger tubes 17 sequentially layered at least on the both surfaces of the PTC heater 19 while sandwiching the PTC heater 19 are layered in parallel with one another, the substrate subassembly 15 in which the control board 13 and the heat exchanger pressing member (pressing member) 16 are combined with each other is provided on the top surface of the upper tier of flat heat exchanger tube 17a of the flat heat exchanger tubes 17, the substrate subassembly 15 is tightened and fixed to the lower case 11b, and thereby the layered heat exchanger 18 is assembled while pressure-bonding the layered three sets of flat heat exchanger tubes 17 and the two sets of PTC heaters 19.

By means of the pressure bonding, the sealing material (a liquid gasket, an O-ring, or the like) 26 interposed between the inlet header sections 22 and between the outlet header sections 23 of the layered heat exchanger 18 is closely attached, and close contact property between the plurality sets of flat heat exchanger tubes 17 and the PTC heaters 19 layered therebetween can be enhanced. Accordingly, thermal contact resistance between each of the flat heat exchanger tubes 17 and the PTC heater 19 can be reduced, a heat transfer efficiency from the PTC heater 19 to the flat heat exchanger tube 17 is improved, and thus high performance of the layered heat exchanger 18 and the heat medium heating apparatus 10 can be achieved. Since heat exchange of the PTC heater 19 and the heat medium can be performed through the layered heat exchanger 18 configured by laminating the plurality sets of flat heat exchanger tubes 17, the heat medium flow box that is the large-size component made by die casting, etc. are not needed, and thus, reduction in size and weight and reduction in cost of the heat medium heating apparatus 10 can be achieved.

When the three sets of flat heat exchanger tubes 17 and the two sets of PTC heaters 19 are pressed by the heat exchanger pressing member 16 to be closely attached to one another, at least one of the input position P1 of the pressing force by the heat exchanger pressing member 16, the position P2 where the pressing force is transmitted to the bonding portion of the two molded plates 17A and 17B, and the position P3 where the pressing force is transmitted to the sealing portion between the inlet header sections 22 and/or between the outlet header sections 23 is, as shown in FIG. 5, set to be deviated from the same line L in the pressing force direction with respect to the inlet header section 22 and the outlet header section 23. Therefore, the pressing force by the heat exchanger pressing member 16 is dispersed in the bonding portion of the two molded plates 17A and 17B or in the sealing portions between the inlet header sections 22 and between the outlet header sections 23, and the pressing force is not strongly applied to a specific part of each of the sealing portions between the inlet header sections 22 and between the outlet header sections 23.

Figure 6A:
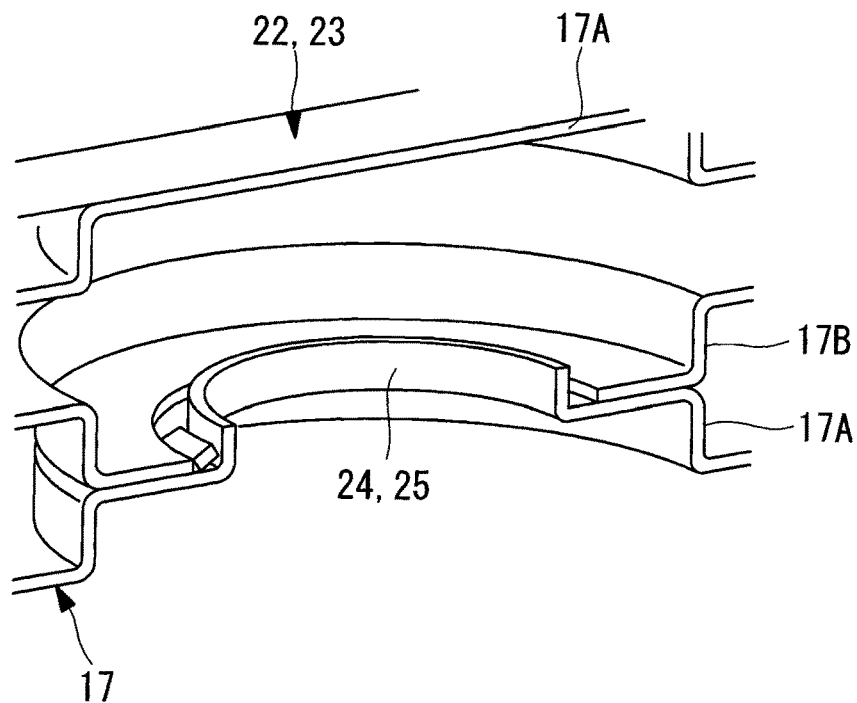
FIG. 6A is an enlarged perspective view representing a bonding state of the inlet/outlet header sections of the layered heat exchanger shown in FIGS. 4A and 4B.
Figure 6B:
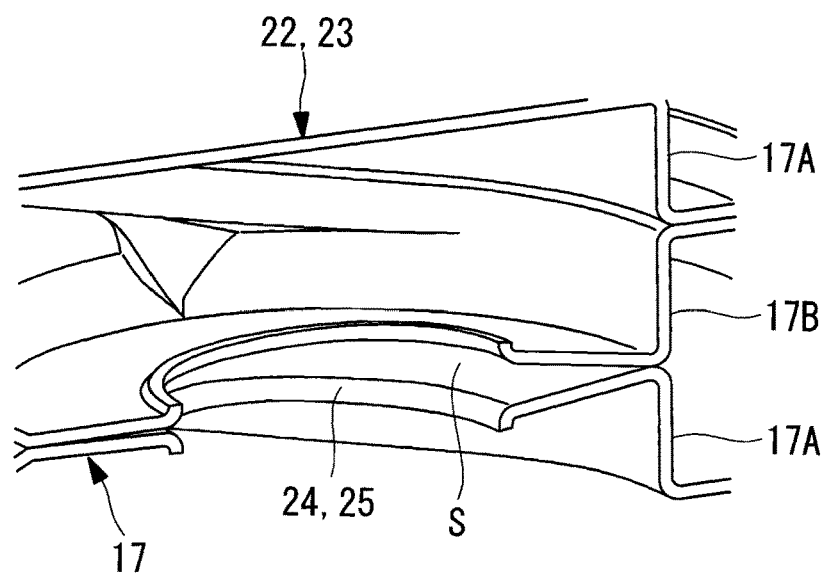
FIG. 6B is a comparative example view representing a bonding state of the inlet/outlet header sections of the layered heat exchanger shown in FIGS. 4A and 4B.

As a result, deformation in a periphery of the specific part due to the pressing force by the heat exchanger pressing member 16 strongly applied to the specific parts of the inlet header section 22 and the outlet header section 23 is suppressed, and generation of a gap in the sealing surface in the periphery of the specific part can be blocked. As a result of it, sealing property of an internal pressure being applied into the flat heat exchanger tube 17 is improved, and leakage of the heat medium can be prevented. In FIGS. 6A and 6B, shown are an analysis result view FIG. 6B when the above-described P1, P2, and P3 are located on the same line L in the pressing force direction, and an analysis result view FIG. 6A when one of them P2 are set at a position deviated from the same line L in the pressing force direction.

When seeing the results, in a case of FIG. 6B, the periphery of the specific part of each of the inlet header section 22 and the outlet header section 23 deforms, a gap S may be generated to deteriorate the sealing property, and when the internal pressure is applied into the flat heat exchanger tube 17, there is fear of leakage of the heat medium. In contrast with this, in a case of FIG. 6A according to the embodiment, it is obvious that deformation of the sealing portions of the inlet header section 22 and the outlet header section 23 hardly generates, and fear of leakage of the heat medium is dispelled.

Sealing is made between the inlet header sections 22 and between the outlet header sections 23 respectively via the sealing material 26, such as a liquid gasket or an O-ring, interposed on the sealing surfaces. Therefore, in the plurality sets of flat heat exchanger tubes 17 being layered, the sealing material 26 as described above is interposed on the sealing surfaces of the inlet header section 22 and the outlet header section 23 and is brought into close contact with the inlet header section 22 and the outlet header section 23 by pressing with the heat exchanger pressing member 16, and thereby sealing between the inlet header sections 22 and between the outlet header sections 23 can be reliably achieved. Accordingly, sealing property between the inlet header sections 22 and between the outlet header sections 23 is sufficiently secured, reliability for prevention of leakage of the heat medium can be improved, and simplification of a sealing structure and easy assembling can be achieved.

The semiconductor switching device 12, such as the IGBT, which is the heat generating device, is provided between the heat exchanger pressing member 16 made of aluminum alloy and the control boards 13. Therefore, the layered flat heat exchanger tube 17 and PTC heater 19 are pressed by the heat exchanger pressing member 16 and the control board 13, and the semiconductor switching device 12 can be cooled by cold energy from the flat heat exchanger tube 17 by using the heat exchanger pressing member 16 as the heat sink. Accordingly, cooling performance of the semiconductor switching device 12 is secured, and higher performance of the heat medium heating apparatus 10 can be achieved. Since both press of the layered flat heat exchanger tubes 17 and cooling of the semiconductor switching device 12 are performed by the heat exchanger pressing member 16, the number of components constituting the heat medium heating apparatus 10 can be reduced, and thus, a size of the whole heat medium heating apparatus 10 can be reduced.

The embodiment is configured such that the heat medium inlet passage (heat medium introduction passage) 11d that introduces the heat medium in the layered heat exchanger 18, and the heat medium outlet passage (heat medium introduction passage) 11e that introduces the heat medium out of the layered heat exchanger 18 are integrally formed in the lower case 11b. Therefore, when the heat medium is supplied to the heat medium heating apparatus 10, stress applied to the layered flat heat exchanger tubes 17 can be dispersed, and thus, a load applied to the flat heat exchanger tubes 17 can be reduced.

A control system constituted by the control board 13 and the semiconductor switching device 12 that control energization to the PTC heater 19 is integrated as the substrate subassembly 15, and the substrate subassembly 15 is incorporated in the casing 11, whereby in electric connection to each electrode plate 14, each terminal block 13a provided on the control board 13 constituting the substrate subassembly 15, and the terminal 14a provided on each electrode plate 14 may just be fixed by the terminal connecting screw 14b, and a wire (harness) for electrical connection can be made unnecessary. Therefore, a wire path is not complicated, assembly can be made easier, and the number of components can be reduced, the wire path of the control system is simplified, and thereby can be obtained the high-performance and compact heat medium heating apparatus 10 in which the flat heat exchanger tube 17, the PTC heater 19, and the control system thereof are integrally incorporated in the casing 11.

The embodiment is configured such that the semiconductor switching device (heat generating device) 12, such as the IGBT, connected to the control board 13 is disposed at a position near an inlet header section 22 side of the flat heat exchanger tube 17. Therefore, the semiconductor switching device 12 can be cooled by means of a heat medium with a relatively low temperature before being heated by the PTC heater 19, and cooling performance of the semiconductor switching device 12 can be much more enhanced.

As described above, a heat transfer efficiency is improved, and leakage of the heat medium, etc. does not occur, lightweight, downsized, and high-performance heat medium heating apparatus 10 is incorporated, and the heat medium circulated in the radiator 6 can be heated, so that improvement in reliability and air-conditioning performance of the vehicle air-conditioning apparatus 1 can be achieved, and also an installation space can be reduced, and mounting property for a vehicle can be improved.

Second Embodiment

Next, a second embodiment of the present invention will be described using FIGS. 7 and 8.

The embodiment is different from the above-described first embodiment in a point where the embodiment is configured such that a burring is provided around the communication holes 24 and 25 of the inlet header section 22 and the outlet header section 23 of the flat heat exchanger tube 17. Since the other points are similar to the first embodiment, description thereof will be omitted.

The embodiment is configured such that burrings 30 and 31 mate-fitted in each other at the time of stacking are formed in peripheries of the communication holes 24 and 25 provided in the inlet header section 22 and the outlet header section 23 of the flat heat exchanger tube 17.

Figure 7:
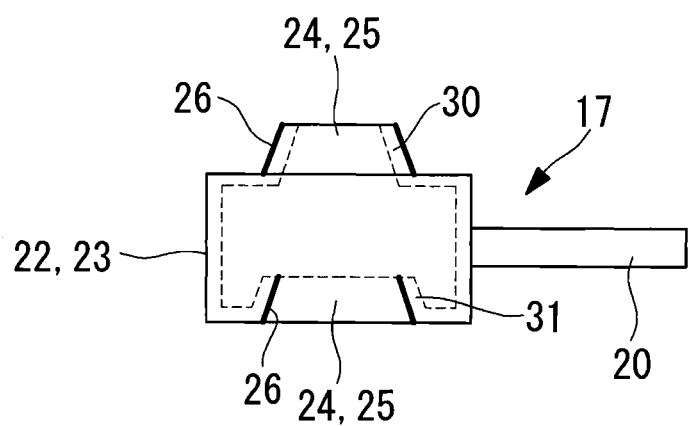
FIG. 7 is a side view of inlet/outlet header portions of a layered heat exchanger pertaining to a second embodiment of the present invention.

The embodiment is configured such that the burrings 30 and 31 are, as shown in FIG. 7, the taper-shaped burrings, and such that when the three sets of flat heat exchanger tubes 17a, 17b, and 17c are layered, the burrings 30 and 31 are mate-fitted in each other between the upper and lower inlet header section 22 and outlet header section 23, and tapered surfaces of the burrings 30 and 31 are closely attached to each other. It is needless to say that the sealing material 26, such as a liquid gasket or an O-ring, is interposed also on the tapered surfaces of the burrings 30 and 31 at the time of stacking.

As described above, the burrings 30 and 31 mate-fitted in each other are provided in the peripheries of the communication holes 24 and 25 of the inlet header section 22 and the outlet header section 23, thereby a strength around the communication holes 24 and 25 of the inlet header section 22 and the outlet header section 23 is improved by means of the burrings 30 and 31, and deformation at the time of press by the heat exchanger pressing member 16 can be more reduced. Since the burrings 30 and 31 can be utilized for positioning at the time of stacking of the plurality sets of flat heat exchanger tubes 17, poor sealing due to position deviation can also be prevented. Accordingly, sealing property between the inlet header sections 22 and between the outlet header sections 23 of the plurality sets of flat heat exchanger tube 17 is improved, and leakage of the heat medium can be reliably prevented.

Since the burrings 30 and 31 are set to have the tapered shape, micro deformation generated when the plurality sets of flat heat exchanger tubes 17 are layered, and the inlet header sections 22 and the outlet header sections 23 are pressed by the heat exchanger pressing member 16 to be brought into close contact with each other is absorbed by means of a tapered portion, the inlet header sections 22 and the outlet header sections 23 can be reliably brought into close contact with each other, and a dimensional tolerance of the flat heat exchanger tube 17 including the inlet and outlet header sections 22 and 23 can also be absorbed by means of the tapered portion. Accordingly, sealing property between the inlet header sections 22 and between the outlet header sections 23 of the plurality sets of flat heat exchanger tubes 17 can further be improved, and leakage of the heat medium can be reliably prevented.

Figure 8:
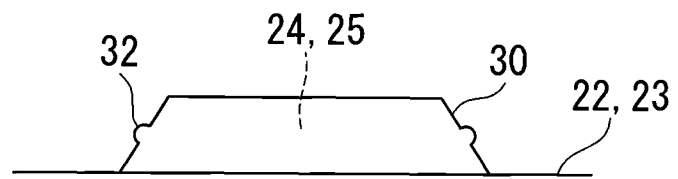
FIG. 8 is a side view of a modified example of the inlet and outlet header portions of the layered heat exchanger shown in FIG. 7.

An accordion-shaped micro projection 32 may be provided on the tapered surface with respect to the above-described burring 30 as shown in FIG. 8, and when the upper and lower burrings 30 and 31 are mate-fitted in each other, by providing such micro projection 32, the burrings 30 and 31 get contact with each other by means of the micro projection 32, and thus it becomes possible to further improve sealing property.

Third Embodiment

Figure 9:
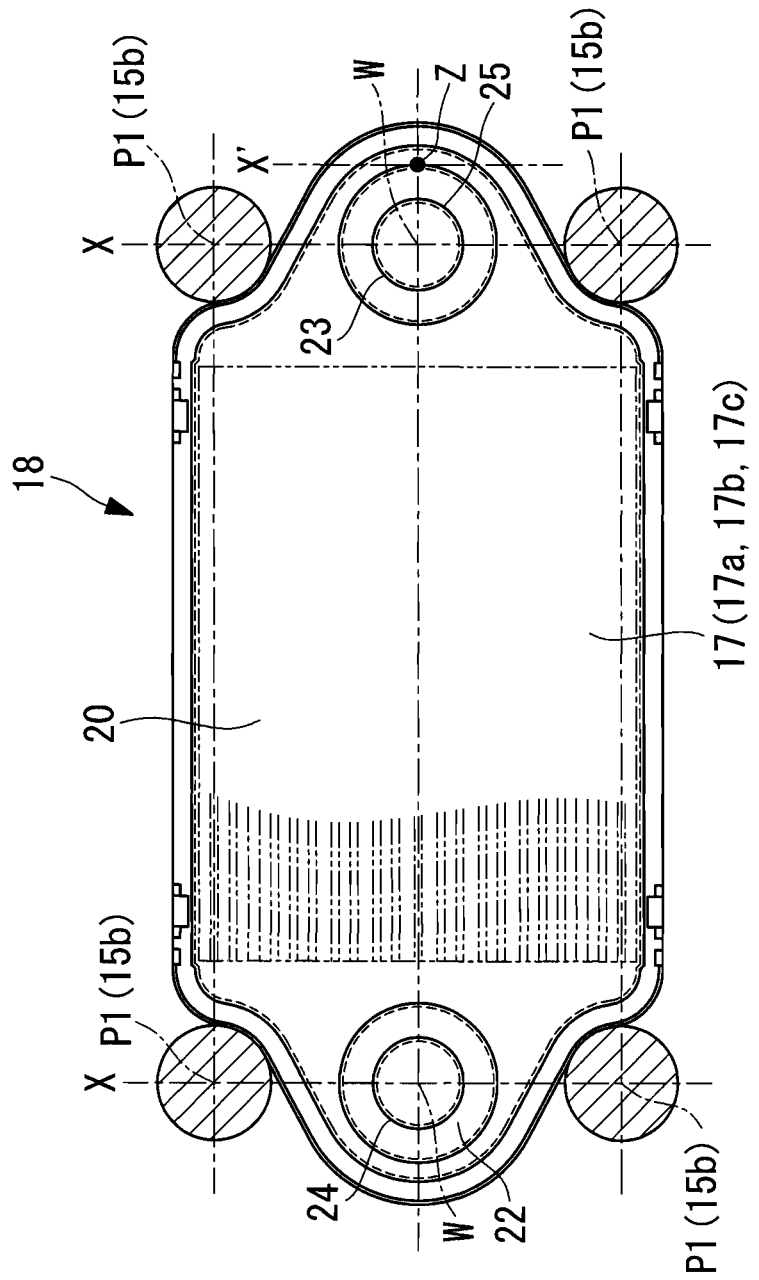
FIG. 9 is a plan arrangement diagram showing a relation between a flat heat exchanger tube of a layered heat exchanger pertaining to a third embodiment of the present invention, and an input position of a pressing force by a heat exchanger pressing member.

Next, a third embodiment of the present invention will be described using FIG. 9.

This embodiment is different from the above-described first embodiment in a point where a position on a flat surface of the input position P1 of the pressing force by the heat exchanger pressing member 16 is identified. Since the other points are similar to the first embodiment, description thereof will be omitted.

As mentioned above, four corners (four corner sections) of the quadrilateral-shaped heat exchanger pressing member 16 are screwed to the lower case 11b through the four substrate subassembly fixing screws 15b. In this embodiment, the input position P1 of the pressing force is, as shown in FIG. 9, a position of the four fixing screws 15b.

It is then set that centers W of the communication holes 24 and 25 of the inlet header section 22 and the outlet header section 23 provided on the both ends of each of the flat heat exchanger tubes 17 (17a, 17b, and 17c) of the layered heat exchanger 18 are respectively located on a line X connecting centers of respective two fixing screws 15 on both ends of the four fixing screws 15b, i.e., the respective two input positions P1 and P1 of the pressing force by the heat exchanger pressing member 16.

As described above, a relation between the center W positions of the communication holes 24 and 25 of the inlet header section 22 and the outlet header section 23, and positions of the four screws 15b with which the heat exchanger pressing member 16 is tightened and fixed, i.e., the input position P1 of the pressing force is set, whereby when the heat exchanger pressing member 16 is tightened and fixed, and the pressing force is applied to the flat heat exchanger tube 17, the force is dispersed in circumferential directions of the communication holes 24 and 25 of the inlet header section 22 and the outlet header section 23, and a portion in the sealing portion around the communication holes 24 and 25 to which the force is locally and strongly applied can be eliminated.

Therefore, deformation in the sealing portion around the communication holes 24 and 25 is suppressed, generation of a gap in the sealing surface can be blocked, similar to the first embodiment, sealing property in an internal pressure being applied into the flat heat exchanger tube 17 is improved, and leakage of the heat medium can be prevented. Incidentally, when the above-described line X is, for example, displaced to an X' position, header sections strongly get contact with each other in a sealing portion near a position Z where the line X' and the communication holes 24 and 25 intersect with one another, deformation occurs around the communication holes 24 and 25, and there is fear of deterioration of the sealing property.

The present invention is not limited to inventions pertaining to the above-described embodiments, and it can be appropriately deformed without departing from the spirit of the invention. For example, the above-described embodiments are configured such that three flat heat exchanger tubes 17 are layered, and the PTC heater 19 is incorporated between the respective flat heat exchanger tubes 17, but the present invention is not limited to this, and it is needless to say that the number of the flat heat exchanger tubes 17 and the number of the PTC heaters 19 may be increased or decreased.

Although examples have been described in the above-described embodiments where in the flat heat exchanger tube 17, the flat tube section 20 and the inlet header section 22 and the outlet header section 23 that are located on the both ends of the flat heat exchanger tube 17 are integrated, the flat tube section 20 and the inlet header section 22 and the outlet header section 23 that are located on the both ends of the flat heat exchanger tube 17 are separately molded, and they may be integrated by brazing to thereby form a flat heat exchanger tube. A shape of the burrings 30 and 31 provided in the inlet header section 22 and the outlet header section 23 is not limited to a tapered one, and the burrings 30 and 31 may be deformed into various shapes, such as providing as a vertical shape.

REFERENCE SIGNS LIST

1 Vehicle air-conditioning apparatus
6 Radiator
10 Heat medium heating apparatus
10A Heat medium circulation circuit
16 Heat exchanger pressing member
17, 17a, 17b, 17c Flat heat exchanger tube
17A, 17B Molded plate
18 layered heat exchanger
19 PTC heater
20 Flat tube section
22 Inlet header section
23 Outlet header section 24, 25 Communication hole
26 Sealing material (Liquid gasket, O-ring, or the like)
30, 31 Burring
32 Micro projection
L Same line in pressing force direction
P1 Input position of pressing force
P2 Position where pressing force is transmitted to bonding portion
P3 Position where pressing force is transmitted to sealing portion
W Center of communication hole
X Line connecting two input positions of pressing force

The invention claimed is:

1. A heat medium heating apparatus comprising:
a layered heat exchanger, that comprises:
a flat heat exchanger tube configured by bonding two molded plates in which an inlet header section and an outlet header section are provided on both ends of a flat tube section and in which a heat medium flow passage through which a heat medium is flowed is formed therein;
a heat exchanger pressing member that presses and makes closely attached to one another a plurality sets of flat heat exchanger tubes layered so that the inlet header section and the outlet header section are communicated with each other through communication holes; and
a plurality sets of PTC heaters that is incorporated between the plurality sets of flat heat exchanger tubes in the layered heat exchanger,
wherein each of the inlet header section and the outlet header section has
a first protrusion protruding from a first molded plate of the two molded plates toward a layered direction of the flat heat exchanger tubes,
a flange portion extending from a root of the first protrusion toward an end of the first molded plate in a longitudinal direction of the first molded plate,
a second protrusion protruding from an end of the flange portion in the longitudinal direction of the first molded plate toward an opposite direction of a protruding direction of the first protrusion, and
surface extending radially outward of each of the communication holes at the inlet header section and the outlet header section in a plan view of the first molded plate,
wherein each of the first seal surfaces of the two molded plates is disposed opposite each other and overlaps, and said overlapped first surface seals form a bonding surface extending to a direction perpendicular to a direction of a pressing force by the heat exchanger pressing member,
wherein a protruding end of the first protrusion protruding from the first molded plate toward the layered direction and an adjacent protruding end of the first protrusion protruding from the first molded plate in the layered direction are faced and butted each other in the layered direction, wherein the inlet header section and the outlet header section have second seal surfaces which protrude from the protruding end of the first protrusion and extend toward a center of the communication hole,
wherein the second seal surface of the inlet header section and the outlet header section and an adjacent second seal surface of the inlet header section and the outlet header section, the second seal surfaces being adjacent in the layered direction of the flat heat exchanger tubes, are faced and in contact with each other in the layered direction and-laid-over from a position where each of the protruding end are faced and butted each other to an end of the second seal surface in a side of the center of the communication hole,
wherein a position where the pressing force is transmitted to the bonding surface of the two molded plates is set as a position radially outward of each of the communication holes from a line passing through an input position of the pressing force to the protrusion by the heat exchanger pressing member and a position where the pressing force is transmitted to a position in which adjacent two second seal surfaces are opposed and laid over, in the direction of the pressing force with respect to the inlet header section and the outlet header section,
wherein the pressing force by the heat exchanger pressing member passes through a position where the adjacent protruding ends of the protrusion protruding from the first molded plate, the protruding ends being adjacent in the layered direction of the flat heat exchanger tubes, are faced and butted each other,
wherein the PTC heater is configured to heat a heat medium flowed through the flat heat exchanger tubes, and
wherein the heat exchanger pressing member presses and makes closely attached the plurality sets of PTC heaters and the flat tube sections of the plurality sets of flat heat exchanger tubes.

2. The layered heat exchanger according to claim 1, wherein burrings mate-fitted in each other are provided around the communication holes of the inlet header section and the outlet header section.

3. The layered heat exchanger according to claim 2, wherein the burrings are made as a tapered shape.

4. The heat medium heating apparatus according to claim 1, wherein sealing is made between the inlet header sections and between the outlet header sections respectively via a sealing material interposed on the second seal sealing surface.

5. The heat medium heating apparatus according to claim 1, wherein the heat exchanger pressing member is made as a quadrilateral shape corresponding to a longitudinal direction of the flat heat exchanger tube, and
wherein when two tightening and fixing sections of each of both ends of the heat exchanger pressing member are set as input positions of the pressing force, centers of the communication holes provided in the inlet header section and the outlet header section of the flat heat exchanger tube are located on a line connecting the two input positions of each of the both ends.

6. A vehicle air-conditioning apparatus configured such that a heat medium heated by a heat medium heating apparatus is circulatable in a radiator disposed in an air channel, wherein
the heat medium heating apparatus is the heat medium heating apparatus according to claim 1.

* * * * *